Patented Dec. 13, 1938

2,140,347

UNITED STATES PATENT OFFICE 2,140,347

PROCESS OF STABILIZING CELLULOSE TRIACETATE

Rudolph S. Bley, Elizabethton, Tenn., assignor to North American Rayon Corporation, New York, N. Y., a corporation of Delaware No Drawing. Application November 22, 1937, Serial No. 175,981

13 Claims. (Cl. 260—102)

The present invention relates to a process of purifying and at the same time stabilizing cellulose triacetate while preserving its solid, i. e., fibrous and/or granular, form.

One object of this invention is to provide for a process of purifying and at the same time stabilizing cellulose triacetate by treating a crude cellulose triacetate in a solid form with anhydrous, liquid ammonia.

Another object of my invention is to provide for a process of purifying and at the same time stabilizing a crude cellulose triacetate by treating it with anhydrous, liquid ammonia at a temperature at which it retains its solid form.

A further object of this invention is to provide for a process of purifying and at the same time stabilizing a crude cellulose triacetate by treating it with anhydrous, liquid ammonia at or below its boiling point.

A further object of my invention is to provide for a process of purifying and at the same time stabilizing a crude cellulose triacetate by treating it with anhydrous, liquid ammonia in the presence of an auxiliary agent, said agent being inert to and at least miscible with said ammonia and incapable of dissolving cellulose triacetate.

Other objects of my invention will become apparent to those skilled in the art from a study of the following specification.

Cellulose triacetate in solid form is conventionally produced either by causing an alkali metal cellulosate to react with an acetyl halide or by treating cellulose with acetic acid and acetic anhydride in the presence of a catalyst and a non-solvent of cellulose triacetate, such as benzene, ethyl acetate, etc. After washing the fibrous and/or granular cellulose triacetate, it is dissolved in chloroform, dioxane, etc., to form a more or less viscous solution from which a threads, film, etc., may be spun by simply removing the solvent from said solution.

Although cellulose triacetate may be prepared from alkali metal cellulosates and acetyl halides, as set forth above, the most economical process of producing cellulose triacetate consists in treating cellulose with acetic acid and acetic anhydride in the presence of an acid catalyst, for example sulphuric acid, and a non-solvent of the triacetate formed. However, although this reaction is smooth, reasonably fast and economical, it results in the formation of solid cellulose triacetate which contains considerable amounts of acidic compounds, such as sulphuric acid, sulphuric acid esters, etc., which cause discoloration of artificial products subsequently formed therefrom.

Innumerable attempts have been made to stabilize cellulose triacetate in solid form by removing the acidic catalysts contained therein since it has the valuable property of being more hydrophobic than cellulose diacetate. U. S. Patent 1,954,729 to Dreyfus of April 10, 1934, discloses the stabilization of cellulose derivatives by treating them with an aliphatic alcoholic amine in the presence of sodium hypochlorite, etc. U. S. Patent 2,019,921 to Malm et al. of November 5, 1935, relates to a process of stabilizing cellulose triacetate by treating it with a petroleum distillate having a boiling range of about 150–200° C. Sindl (vide U. S. Patent 2,066,584 of January 5, 1937) stabilizes cellulose triacetate containing sulphuric acid residues in a swelled state with a mixture of a lower fatty acid and a liquid ester of a lower fatty acid. U. S. Patent 2,071,333 to Dreyfus of February 23, 1937, removes the acid catalysts by treating crude cellulose triacetate with steam. Alkali fluorides and borates are used for the same purpose by Ellis et al. as disclosed in their U. S. Patent 2,072,253 of March 2, 1937. U. S. Patent 2,072,260 to Haney of March 2, 1937, discloses the elimination of acid catalysts from crude cellulose triacetate by means water-insoluble salts of basic character. Martin (vide U. S. Patent 2,072,270 of March 2, 1937) neutralizes the acid residues with sodium acetate, etc. U. S. Patent 2,095,334 to Jones of October 12, 1937, relates to a process of stabilizing cellulose triacetate by passing through it a hot 0.01 to 0.03% sulphuric acid solution. Malm and Fordyce (vide U. S. Patent 2,095,822 of October 12, 1937) remove the acid catalyst of cellulose triacetate with butyric acid, etc.

Furthermore, I am well aware that cellulose has been rendered more reactive by treating it with liquid ammonia (vide U. S. Patent 1,173,336 to Bronner of February 29, 1916), and that U. S. Patents 1,966,756 to Gajewski and 2,012,382 to Fink, discloses the dissolution of fibroin in anhydrous, liquid ammonia. I am also well aware that cellulose diacetate has been dissolved in liquid, anhydrous ammonia to form solutions from which artificial products may be spun, as set forth for example in U. S. Patent 1,544,809 to Clancey of July 7, 1925, and that nitrogenous cellulose derivatives have been prepared by causing ammonia in anhydrous alcohol to react with cellulose esters having unsaturated radicals in accordance with a process disclosed in U. S. Patent 2,073,052 to Dreyfus of March 9, 1937.

By extensive experimentation I have unexpectedly found that cellulose triacetate can be stabilized and at the same time purified by treating it with anhydrous liquid ammonia. During this treatment cellulose diacetate present as contamination in the crude cellulose triacetate is dissolved by the anhydrous, liquid ammonia and the acid catalyst, for example sulphuric acid, also contained therein, is neutralized with the formation of a corresponding ammonium salt, such as ammonium sulphate. Since ammonium sulphate is only slightly soluble in anhydrous, liquid ammonia, the crude cellulose triacetate should preferably be covered with a sufficient amount of anhydrous, liquid ammonia to bring about a complete removal of the ammonium sulphate by dissolution. Residual ammonium sulphate may also be removed by washing at a low temperature to prevent hydrolysis of the cellulose triacetate. Sulphuric acid esters, occurring in crude cellulose triacetate, are probably ammonolyzed during this treatment with anhydrous, liquid ammonia. Although I prefer to use anhydrous, liquid ammonia at its boiling point, i. e., about $-33°$ C., my process may be carried out at temperatures below $-33°$ C. by evacuating the container in which the crude cellulose triacetate is treated with anhydrous, liquid ammonia. In this manner, a complete stabilization and purification of crude cellulose triacetate may be achieved even at a temperature of about $-50°$ C. Furthermore it is also within the purview of the present invention to purify and stabilize crude cellulose triacetate by treating it at temperatures above $-33°$ C. in closed containers, although care must be exercised to prevent ammonolysis of the cellulose triacetate at temperatures above $0°$ C. This critical temperature varies according to the type of cellulose triacetate treated and it must be predetermined by experimentation.

The stabilization and purification of a crude cellulose triacetate, as set forth above, may also be carried out in the presence of an auxiliary agent or a plurality of auxiliary agents. Auxiliary agents, in accordance with my present invention, are such compounds as are miscible with or capable of being dissolved in anhydrous, liquid ammonia without decomposition by chemical interaction, i. e., compounds which are inert to anhydrous, liquid ammonia. In addition, these auxiliary agents must be such compounds which are incapable of decomposing or dissolving cellulose triacetate. They may be organic or inorganic compounds, such as benzene, ethers, esters, alcohols, metal nitrates, ammonium salts, metal sulfites, etc. Sodium nitrate, for example, offers the advantage of reducing the vapor pressure and corrosiveness of anhydrous, liquid ammonia while being a non-solvent of cellulose triacetate. Such auxiliary agents allow a very prolonged treatment of cellulose triacetate at temperatures above $-33°$ C. with anhydrous, liquid ammonia. They may also be used with liquid, anhydrous ammonia at or below its boiling point, although I have found that liquid, anhydrous ammonia does not decompose or dissolve cellulose triacetate at temperatures ranging from about $-50$ to $0°$ C. upon exposing it to a continuous treatment of about 15 hours' duration. Although this period of time is ample to completely purify and stabilize any crude triacetate, it may be prolonged without a substantial deleterious effect.

In carrying out my stabilizing and purifying process, I introduce a fibrous and/or granular crude cellulose triacetate in a Dewar flask or a similar container filled with liquid, anhydrous ammonia and allow it to remain therein until the residual cellulose diacetate has been dissolved and the acid catalyst neutralized. The following table depicts the results obtained by varying the duration of treatment:

Table

| Duration of treatment, hours | Sulphuric acid content of crude triacetate, percent by weight | Sulphuric acid content of triacetate after treatment, percent by weight |
| --- | --- | --- |
| 1 | 1.5 | 0.068 |
| 2 | 1.5 | 0.036 |
| 3 | 1.78 | 0.024 |
| 4 | 1.78 | 0.017 |
| 5 | 1.78 | 0.012 |
| 15 | 1.78 | Could not be analyzed with existing methods. |

The crude acetate turned brown at about $108°$ C. and charred at $120°$ C., while the stabilized triacetates containing less than 0.024% of sulphuric acid remained perfectly white upon prolonged exposure to dry heat at a temperature of about $203°$ C. and did not char at a temperature at $250°$ C. The anhydrous, liquid ammonia contained dissolved cellulose diacetate, ammonium sulphate and other impurities. After decanting this anhydrous, liquid ammonia the pure and stabilized cellulose triacetate was recovered by allowing the residual ammonia to evaporate therefrom. The liquid, anhydrous ammonia may be used over again after being freed from the aforesaid impurities, and the ammonia vapors may be condensed to form liquid, anhydrous ammonia.

Example I

About 50 grams of cellulose linters are completely acetylated with 1475 ml. of acetic anhydride in the presence of 40 grams of concentrated sulphuric acid and 2640 ml. of ethyl acetate. The fibrous cellulose triacetate, after a preliminary wash, contains about 1.78% of sulphuric acid. About 8 grams of this crude triacetate are introduced into about 300 ml. of liquid, anhydrous ammonia at a temperature of about $-33°$ C. for about 4 hours. The fibrous triacetate is separated from the ammonia containing cellulose diacetate, ammonium sulphate and other impurities by decantation and subsequent evaporation of residual ammonia. The pure, stable triacetate contains about 0.017% of sulphuric acid. It is completely dissolved by chloroform, dioxane and other triacetate solvents. By prolonging the treatment in liquid, anhydrous ammonia, the sulphuric acid may be completely removed. The triacetate does not contain any organic contaminations.

Example II

About 10 grams of the crude triacetate, prepared as set forth in Example I, are introduced into about 300 ml. of liquid, anhydrous ammonia containing about 20 ml. of benzene. After a treatment of 5 hours, the fibrous triacetate is clearly soluble in chloroform and contains about 0.012% of sulphuric acid.

Example III

A commercial, stabilized cellulose triacetate in granular form containing about 0.06% of sulphuric acid is treated with anhydrous, liquid ammonia for about 10 hours at a temperature of about —33° C. Sulphuric acid cannot be detected by the standard methods. The ammonia contains dissolved cellulose diacetate and ammonium sulphate, and the purified triacetate does not char at 260° C.

*Example IV*

A fibrous cellulose triacetate containing about 1.5% sulphuric acid by weight is treated for about 3 hours in liquid, anhydrous ammonia saturated with sodium nitrate in a single-walled beaker at room temperature for about 4 hours. After freeing the fibrous triacetate from ammonia and sodium nitrate, it contains about 0.02% of sulphuric acid, by weight.

Although these examples will serve to illustrate my invention, I wish to emphasize that the stabilization and purification of crude cellulose triacetate may be carried out at lower and higher temperatures, that the times of treatment may be varied and that other auxiliary agents may be used with equal success. The crude triacetate may be prepared with any acid catalyst known in the art, such as sulphuric acid, hydrochloric acid, sulphonamides, phosphoric acids, acid salts, etc., which can be neutralized by liquid, anhydrous ammonia with the formation of an innocuous ammonium salt. Modifications of my invention will readily be recognized by those skilled in the art and I desire to include all such modifications and variations coming within the scope of the appended claims. In these claims the term "liquid, anhydrous ammonia" is intended to comprise the liquefied gas having the formula $NH_3$ which, however, may contain such amounts of water as are unavoidable in the liquefaction when operated on a commercial scale.

I claim:

1. The process of purifying and at the same time stabilizing a crude cellulose triacetate which comprises introducing a solid cellulose triacetate containing cellulose diacetate and an acid catalyst into anhydrous, liquid ammonia to remove said diacetate by dissolution and said catalyst by neutralization from said triacetate, and subsequently separating said ammonia containing said diacetate and said catalyst from said cellulose triacetate.

2. The process of purifying and at the same time stabilizing a crude cellulose triacetate which comprises introducing a solid cellulose triacetate containing cellulose diacetate and an acid catalyst into anhydrous, liquid ammonia at a temperature of about —33° C. to remove said diacetate by dissolution and said catalyst by neutralization from said triacetate, and subsequently separating said ammonia containing said diacetate and said catalyst from said cellulose triacetate.

3. The process of purifying and at the same time stabilizing a crude cellulose triacetate which comprises introducing a solid cellulose triacetate containing cellulose diacetate and an acid catalyst into anhydrous, liquid ammonia at a temperature below —33° C. to remove said diacetate by dissolution and said catalyst by neutralization from said triacetate, and subsequently separating said ammonia containing said diacetate and said catalyst from said cellulose triacetate.

4. The process of purifying and at the same time stabilizing a crude cellulose triacetate which comprises introducing a solid cellulose triacetate containing cellulose diacetate and an acid catalyst into anhydrous, liquid ammonia in the presence of an auxiliary agent to remove said diacetate by dissolution and said catalyst by neutralization from said triacetate and subsequently separating said ammonia containing said diacetate and said catalyst from said triacetate, said auxiliary agent being a non-solvent of said triacetate and inert to said ammonia.

5. The process of purifying and at the same time stabilizing a crude cellulose triacetate which comprises introducing a solid cellulose triacetate containing cellulose diacetate and an acid catalyst into anhydrous, liquid ammonia at a temperature of about —33° C. in the presence of an auxiliary agent to remove said diacetate by dissolution and said catalyst by neutralization from said triacetate and subsequently separating said ammonia containing said diacetate and said catalyst from said triacetate, said auxiliary agent being a non-solvent of said triacetate and inert to said ammonia.

6. The process of purifying and at the same time stabilizing a crude cellulose triacetate which comprises introducing a solid cellulose triacetate containing cellulose diacetate and an acid catalyst into anhydrous, liquid ammonia at a temperature below —33° C. in the presence of an auxiliary agent to remove said diacetate by dissolution and said catalyst by neutralization from said triacetate and subsequently separating said ammonia containing said diacetate and said catalyst from said triacetate, said auxiliary agent being a non-solvent of said triacetate and inert to said ammonia.

7. Solid cellulose triacetate free from cellulose diacetate and substantially devoid of an acid catalyst, being clearly soluble in chloroform, having no discoloration when subjected to dry heat of 200° C., prepared in accordance with the process set forth in claim 1.

8. Solid cellulose triacetate free from cellulose diacetate and substantially devoid of an acid catalyst, being clearly soluble in chloroform, having no discoloration when subjected to dry heat of 200° C., prepared in accordance with the process set forth in claim 2.

9. Solid cellulose triacetate free from cellulose diacetate and substantially devoid of an acid catalyst, being clearly soluble in chloroform, having no discoloration when subjected to dry heat of 200° C., prepared in accordance with the process set forth in claim 3.

10. The process of stabilizing cellulose triacetate in fibrous form which comprises introducing a fibrous cellulose triacetate into anhydrous, liquid ammonia and subsequently separating said triacetate from said ammonia.

11. The process of stabilizing cellulose triacetate in fibrous form which comprises introducing a fibrous cellulose triacetate into anhydrous, liquid ammonia at a temperature of about —33° C. and subsequently separating said triacetate from said ammonia.

12. The process of stabilizing cellulose triacetate in fibrous form which comprises introducing a fibrous cellulose triacetate into anhydrous, liquid ammonia at a temperature below —33° C. and subsequently separating said triacetate from said ammonia.

13. The process of stabilizing cellulose triacetate in fibrous form which comprises introducing a fibrous cellulose triacetate into anhydrous, liquid ammonia containing an auxiliary agent and subsequently separating said triacetate from said ammonia.

RUDOLPH S. BLEY.